US007767727B2

(12) United States Patent
Taylor

(10) Patent No.: US 7,767,727 B2
(45) Date of Patent: Aug. 3, 2010

(54) AUTOXIDISABLE ARCHITECTURAL COATING COMPOSITIONS

(75) Inventor: Philip Louis Taylor, Burnham (GB)

(73) Assignee: Imperial Chemical Industries PLC, London (GB)

( * ) Notice: Subject to any disclaimer, the term of this patent is extended or adjusted under 35 U.S.C. 154(b) by 79 days.

(21) Appl. No.: 11/573,935

(22) PCT Filed: Jun. 11, 2006

(86) PCT No.: PCT/EP2006/006780

§ 371 (c)(1),
(2), (4) Date: Nov. 19, 2007

(87) PCT Pub. No.: WO2007/017032

PCT Pub. Date: Feb. 15, 2007

(65) Prior Publication Data

US 2008/0188584 A1 Aug. 7, 2008

(30) Foreign Application Priority Data

Aug. 5, 2005 (GB) ................... 0515701.1

(51) Int. Cl.
*C09D 167/08* (2006.01)
*C09D 177/12* (2006.01)
*C07C 49/84* (2006.01)
*C08F 2/48* (2006.01)

(52) U.S. Cl. ............... 522/44; 522/29; 522/33; 522/164; 522/913; 522/914; 428/474.4; 427/519; 106/285; 106/287.17; 106/287.18; 106/287.24

(58) Field of Classification Search .......... 522/29, 522/33, 164, 44, 913, 914; 106/285, 287.17, 106/287.18, 287.24; 427/519; 428/474.4
See application file for complete search history.

(56) References Cited

U.S. PATENT DOCUMENTS

| 4,387,190 A | 6/1983 | Feely |
| 5,780,526 A | 7/1998 | Matsui et al. |

| 2004/0013895 A1 | 1/2004 | Dean et al. | |
| 2004/0151931 A1* | 8/2004 | Dean et al. | 428/507 |

FOREIGN PATENT DOCUMENTS

| CN | 1 526 740 | | 9/2004 |
| WO | EP1505130 A1 | * | 2/2005 |
| WO | WO 2005/014738 | | 2/2005 |

OTHER PUBLICATIONS

International Search Report and Written Opinion, International PCT Application No. PCT/EP2006/006780, mailed Nov. 9, 2006.
International Preliminary Report on Patentability, International PCT Application No. PCT/ EP2006/006780, mailed Feb. 5, 2008.
EPO Standard Search Report, RS 112783/GB 0515701, dated Jan. 25, 2006.
W.M.Morgans, "Outlines of Paint Technology," pp. 211-218, 228-229 vol. 1, 2nd Ed. 1988.
GPA Turner, "Introduction to Paint Chemistry and Principles of Technology," 1988 pp. 159-160, 222-223, 3rd Ed.
British Standard 3900 part D5, 1995.

* cited by examiner

*Primary Examiner*—Fred M Teskin
(74) *Attorney, Agent, or Firm*—Kenyon & Kenyon LLP

(57) ABSTRACT

An autoxidisable architectural coating composition suitable for application to surfaces found in and around buildings at ambient temperatures and in natural daylight wherein surface autoxidation of the composition is promoted by a combination of low concentrations of metal ions (especially manganese or vanadium) and 2,2-dimethoxy-1,2-diphenylethan-1-one as photoinitiator. The composition avoids the need to use more than trace amounts cobalt ions which are rumoured to be carcinogenic yet achieves adequately fast rates of autoxidation. Preferably the use of cobalt is avoided altogether. The use of the low concentrations of the other metal ions reduces discoloration of the compositions often to levels below what is achieved using conventional cobalt promoters. Also a modification in which surface autoxidation is promoted by a combination of 2,2-dimethoxy-1,2-diphenylethan-1-one and trace amounts of cobalt ions in the absence of other surface autoxidation promoting metal ions. Finally, a method for applying the autoxidisable coatings to surfaces under ambient temperatures in which they are subject to natural daylight or similar low energy irradiation is disclosed.

19 Claims, 2 Drawing Sheets

2,2-dimethoxy-1,2-diphenylethan-1-one

AUTOXIDISABLE ARCHITECTURAL COATING COMPOSITIONS

CROSS-REFERENCE TO RELATED APPLICATION

This application is the national phase under 35 U.S.C. §371 of PCT International Application No. PCT/EP2006/006780 having an international filing date of Jun. 11, 2006 entitled "AUTOXIDISABLE ARCHITECTURAL COATING COMPOSITIONS", which was filed in the English language and which designated the United States of America, and which claims the benefit of priority to Great Britain Patent Application No. 0515701, filed on Aug. 5, 2005. This application also claims the benefit of provisional patent application Ser. No. 60/728,116 fil ed Oct. 19, 2005 entitled "AUTOXIDISABLE ARCHITECTURAL COATING COMPOSITIONS". The disclosure of all of these applications is hereby incorporated in their entirety by reference.

FIELD OF THE INVENTION

This invention relates to an autoxidisable architectural coating composition suitable for application by unsophisticated users having no special respiratory protection to surfaces at ambient temperatures (say 5 to 40° C.) in natural daylight which composition contains an autoxidisable binder polymer and a surface promoter system containing little or no cobalt for promoting surface autoxidation of the binder polymer.

BACKGROUND OF THE INVENTION

Autoxidation of architectural coating composition takes place at ambient temperatures and in natural daylight and so occurs slowly unless it is accelerated by the presence of a both a surface promoter system and a through promoter system. Such promoters are often called "driers" but in this description they will be called "promoters" to avoid confusion with the more usual concept of drying which involves loss of solvent from the coating composition after it has been applied to a surface.

Architectural coating compositions such as paints, lacquers and varnishes which autoxidise at ambient temperatures in natural daylight are commonly used on site to coat surfaces found in or around buildings. Accordingly, the compositions are usually called "autoxidisable architectural coating compositions" and they need to be suitable for application at ambient temperatures in natural daylight by unsophisticated users having no respiratory protection and who use simple application tools such as brushes, rollers or pads. Once applied to a surface, the coating dries (in the sense of losing solvent by evaporation) and undergoes autoxidation to form crosslinks between the polymer chains comprising the binder whereby a solid coherent dried coat is formed which is bonded to the surface. Autoxidation involves the uptake of oxygen from the surrounding air which is mediated and promoted by various metal ions. Such architectural coatings are capable of undergoing autoxidation at ambient temperatures ranging from 0 to 40° C.

Autoxidisable architectural coating compositions may comprise either autoxidisable binder polymer dissolved in organic solvent such as white spirit or dispersions of autoxidisable binder polymer in water. Generally, the compositions will also contain non-film-forming components such as particulate inorganic and/or organic pigments or opacifiers (for example particulate titanium dioxide, especially rutile or polymeric organic particles containing voids) or extenders (for example chalk, dolomite, clays or talc) as well as other optional ingredients such as matting agents (for example silica), structuring agents (for example titanium or zirconium chelates or laponite or bentonite clays), antifoaming agents and biocides. Pigment grade rutile particles are coated with other oxides such as silica in order to minimise degradation of the coating by light.

The autoxidisable film-forming binder polymer is an essential component of an autoxidisable architectural coating composition partly because it autoxidises to form the coherent coat which bonds to the surface to which it has been applied and partly because it binds together any non-film-forming components which may be present in the composition such as those described above. During autoxidation, autoxidisable moieties in the binder polymer are believed to form crosslinks between adjacent polymer chains resulting in a significant increase in the weight average molecular weight of the binder polymer.

The best known autoxidisable architectural coating compositions contain autoxidisable binder polymers which are alkyd resins. Alkyd resins are described on pages 211 to 218 and 228 and 229 of Volume 1 of the 2nd Edition of the book "Outlines of Paint Technology" by W. M. Morgans and published in 1998 by Griffin of London. The contents of these pages from Morgans are herein incorporated by reference. Morgans explains that, essentially, alkyd resins are condensates of dicarboxylic acids with polyhydric alcohols to which are attached long chain moieties containing autoxidisable ethylene unsaturation. These long chain moieties are ethylenically unsaturated fatty acids, usually obtained from vegetable oils. Alkyd resins containing 60 to 85 wt % of the moieties are often called "long oil" alkyds whilst those containing 45 to 60 wt % are called "medium oil" alkyds and those with only 25 to 45 wt % are called "short oil" alkyds. Alkyd resins can be vulnerable to yellowing with age and so they should avoid the presence of cyclo-alkenyl moieties which aggravate the yellowing problem. Alkyd resins should also avoid oxidisable moieties such as allyl ether groups which degrade to give acrolein which is a potent and toxic lachrymator, painful and possibly dangerous to users not having respiratory protection. Examples of autoxidisable moieties which are suitable include those derived from linseed oil, soya bean oil, safflower oil, cotton seed oil, dehydrogenated castor oil, tall oil and tung oil.

Examples of suitable dicarboxylic acids for use in making alkyd resins include ortho-phthalic, iso-phthalic, terephthalic, maleic, fumaric, adipic and sebacic acids or their anhydrides. Suitable polyhydric alcohols include ethylene glycol, glycerol, pentaerythritol, 1,2 propylene glycol, trimethylol propane and neopentyl glycol.

As mentioned above, unpromoted autoxidisable binder polymers such as alkyd resins autoxidise far too slowly at ambient temperatures in natural daylight to be of much practical use in architectural paints because they are applied on site as opposed to being applied to a factory where autoxidation can be conveniently accelerated by use of high energy irradiation (eg. actinic irradiation) or by stoving at temperatures well above ambient. Clearly, it is not very practicable to provide high energy irradiation or stoving facilities on site especially for use by unsophisticated users and so architectural coating compositions need to contain promoter systems to accelerate their autoxidation. Typical promoter systems are described (using the alternative name of "driers") on pages 159 and 160 of the 3rd Edition of book "Introduction to Paint Chemistry and Principles of Technology" by GPA Turner published in 1988 by Chapman and Hall of London. The contents of these pages 159 and 160 are herein incorporated by reference.

As indicated earlier, there are two types of promoter systems commonly employed in architectural paints, namely "surface promoters" and or "through promoters". Surface promoters accelerate autoxidation in the surface layers of an applied coating probably by catalysing the uptake of oxygen and the decomposition of peroxides to form free radicals which cause crosslinking. In contrast, through promoters accelerate the increase in weight average molecular weight of the binder polymer in the lower levels of the coating. Conventional surface promoters comprise carboxylates, preferably octoates, 2-ethyl hexanoates or naphthenates of cobalt, manganese, vanadium, iron, chromium, copper, tin and cerium. Conventional through promoters comprise compounds of the above carboxylates with one or more carboxylates of zirconium, calcium, barium, strontium, lithium, sodium, potassium, zinc, neodymium, bismuth, lead and aluminium as well as alkoxides of aluminium.

To achieve sufficiently fast rates of surface autoxidation, conventional surface promoters are normally used in amounts such that the concentration of their transition metal ions based on the weight of all the autoxidisable binder polymer in the composition is at least 0.01 wt % up to 0.1 wt % with the preferred range being 0.4 to 0.07 wt %. To achieve sufficiently fast rates of autoxidation in the lower levels of a coating, conventional through promoters are normally used in amounts such that the concentration of all their metal ions based on the weight of the autoxidisable binder polymer in the composition is at least 0.3 wt % and generally up to 2 wt % with the preferred range being 0.5 to 1.5 wt %.

Several transition metal ions, notably those of copper, iron, chromium or manganese discolour coating compositions unless the composition is heavily pigmented. Discoloration due to cobalt ions is much less and so cobalt carboxylates have established themselves as the surface promoters ubiquitously used in architectural paints because their use means that it is easier to make the popular light pastel shades of colour. However there are now rumours that cobalt ions may be carcenogenic, and so they should be used only in systems where the concentration of cobalt ions is below 0.01 wt % based on the autoxidisable binder copolymer. Preferably the promoter systems should contain no cobalt ions at all, that is to say they should be non-cobalt promoter systems.

Photoinitiators are often used together with high energy irradiations (often called "actinic" radiation) to accelerate the crosslinking of paints applied under factory conditions. Pages 222 and 223 of Tuner, ibid, describe industrial coating compositions containing photoinitiators and either unsaturated polyesters or unsaturated acrylic (including methacrylate) polymers. Turner states that flat articles coated with the composition may be conveyed under powerful ultraviolet lamps which irradiate the coated articles with high energy artificial ultraviolet light which decomposes the photoinitiator generating free radicals which harden the coating and create a coherent dried coat. Similarly, U.S. Pat. No. 4,387,190 (published in 1983) discloses that a combination of photoinitiators and actinic radiation can be used as an alternative to autoxidation, to polymerise coatings containing dicyclopentenyl methacrylates or alkoxy methacrylates. Actinic radiation is high energy radiation of the type conveniently available under factory conditions whereas only daylight or low energy lighting is realistically available on site in a building. This means that those coatings of U.S. Pat. No. 4,387,190 which contain photoinitiators are not architectural coating compositions. United States applications, US 2004/0013895 and US 2004/0151931 disclose coating compositions comprising a polymer containing both autoxidisable moieties derived from ethylenically unsaturated fatty acids, and non-autoxidisable moieties derived from isocyanate functional ethylenically unsaturated compounds. The non-autoxidisable moieties on one polymer molecule form cross-links with a similar moiety on another polymer molecule by first reacting with free radicals generated by a thermally decomposing initiator and/or photoinitiator following exposure to actinic radiation.

International Application PCT/EP2004/008250 published as WO 2005/014738 describes the use of photoinitiators in combination with surface autoxidation promoters such as cobalt and vanadium. However, the photoinitiators used are either inefficient, requiring high levels in the paint formulations to be effective, or they are manufactured by complex, low yielding synthetic routes making them impractically costly for use in architectural paints.

SUMMARY OF THE INVENTION

It is an object of this invention to provide an autoxidisable architectural coating composition suitable for application to surfaces at ambient temperatures and natural daylight by unsophisticated users having no respiratory protection which composition contains an autoxidisable binder polymer and promoter system containing low to zero concentrations of cobalt ions for promoting autoxidation of the binder polymer.

Accordingly, this invention provides an autoxidisable architectural coating composition suitable for application to surfaces at ambient temperatures and in natural daylight which composition contains an autoxidisable binder polymer and a promoter system for promoting autoxidation of the autoxidisable binder polymer wherein the system comprises
  a) less than 0.01 wt % (preferably 0 wt %) of cobalt ions based on the weight of the autoxidisable binder polymer in the coating composition,
  b) from 0.001 to 0.06 wt % (based on the weight of autoxidisable binder polymer in the coating composition) of metal ions other than cobalt ions, being metal ions which promote surface autoxidation,
  c) 2,2-dimethoxy-1,2-diphenylethan-1-one preferably present in amounts of from 0.3 to 2 wt % based on the weight of the autoxidisable binder polymer in the composition and most preferably from 0.5 to 1.5 wt % and wherein the binder polymer is free of moieties derived from isocyanate functional ethylenically unsaturated compounds.

DETAILED DESCRIPTION

Preferably the binder polymer is free of moieties derived from isocyanate functional ethylenically unsaturated compounds which are non-autoxidisable.

2,2-dimethoxy-1,2-diphenylethan-1-one is a photoinitiator which means that on exposure to light a photoreaction occurs which activates it causing it to produce reactive species. These species are thought to be free radicals which help cause the autoxidisable moieties on the alkyd resins comprising the binder to crosstalk and the paint to harden. Mixtures of 2,2-dimethoxy-1,2-diphenylethan-1-one and camphorquinone may also be used.

The coatings obtained do not suffer from the aggravated yellowing caused by dicyclo-pentenyl moieties. They also have a lower odour than conventional autoxidisable architectural paints and they are certainly not contaminated by acrolein obtained from the degradation of allyl ether groups. The autoxidisable coating composition may also contain other conventional components such as the non-film-forming components mentioned earlier. In particular, they may contain pigment/opacifiers such as rutile (and especially pigment grade rutile) even though pigments might be expected to impede access of light to the photoinitiator.

The metal ions other than cobalt which promote surface autoxidation are preferably manganese and/or vanadium because they promote a faster rate of autoxidation than do other non-cobalt ions. Of these two, manganese is the faster. Metal ions may be also or additionally selected from for example nickel, iron, chromium, copper, tin and cerium. The preferred total concentration of surface autoxidation promoting metal ions, other than cobalt ions, in the coating composition is 0.001 to 0.04 wt %, more preferably from 0.004 to 0.03 wt % based on the weight of the autoxidisable binder polymer in the coating composition.

It has been discovered that the use of a low concentration of non-cobalt autoxidation promoting metal ions in combination with at least one photoinitiator achieves rates of autoxidation which are acceptably similar in speed to what can be achieved with conventional cobalt promoter systems. A fast rate of surface autoxidation is indicated by a short period of time needed for the coat to become dry to the touch. This period of time is called the "touch dry time" and a procedure for its measurement is described later. Similarly, a fast rate of presumed autoxidation in the lower levels of the coat is indicated by a short time needed for the coat to resist penetration by a light weight needle. This period is called the "through dry time" and a procedure for its measurement is also described later.

It has been discovered that only low concentrations of manganese or vanadium ions are needed for a successful performance of this invention and so the level of discoloration of the dried coat of paint is at least tolerable and can even be lower than the levels caused by conventional cobalt systems. Discoloration is inversely proportional to the percentage of whiteness in the colour of the dried coat and percentage whiteness can be conveniently measured by conventional spectrophotometric techniques. Therefore percentage whiteness is a convenient inverse measure of discoloration.

Manganese/photoinitiator surface promoter systems frequently have a further advantage when used in gloss paints in that the desired coat of gloss paint usually has a higher specular gloss than corresponding paints containing a conventional cobalt surface promoter system. Specular gloss is measured according to British Standard 3900 Part D5 of 1995 using an angle of incidence of either 60° or 20°, but 60° is used for the purposes of this description.

The 2,2-dimethoxy-1,2-diphenylethan-1-one is activateable by natural daylight, preferably by light in the visible and ultraviolet region of the electromagnetic spectrum. The corresponding wavelength range is from about 200 to 750 nanometers. Other lighting sources of the type found in buildings, eg. 40 to 250 watt tungsten filament lamps or fluorescent tubes are also capable of activating the photoinitiator. The graphical formulae of 2,2-dimethoxy-1,2-diphenylethan-1-one together with its absorbance spectrum is shown in FIG. 1 of the drawings which accompany this description.

Preferably the metal/photoinitiator surface promoter systems should be used in combination with at least one of the conventional through promoters. Through promoter systems comprising combinations of any two or all three of zirconium, calcium and lithium carboxylates are especially preferred.

This invention also provides a method for applying a dried coat of an architectural coating composition to a surface in which a liquid coating of the composition is applied to the surface at ambient temperatures wherein the composition contains an autoxidisable binder polymer and a system for promoting surface autoxidation of the autoxidisable binder polymer and wherein the system comprises a) less than 0.01 wt % (preferably 0 wt %) of cobalt ions based on the weight of the autoxidisable binder polymer in the coating composition, b) from 0.001 to 0.06 wt % (based on the weight of autoxidisable binder polymer in the coating composition) of metal ions other than cobalt ions being metal ions which promote surface autoxidation and c) 2,2-dimethoxy-1,2-diphenylethan-1-one preferably present in amounts of from 0.3 to 2 wt % based on the weight of the autoxidisable binder polymer in the composition and most preferably from 0.5 to 1.5 wt % and wherein the binder polymer is free of moieties derived from isocyanate functional ethylenically unsaturated compounds and the coating composition is exposed illumination by light (especially natural daylight) of wavelength in the range 200 to 750 nm.

The method can be used on site to coat surfaces found in or around buildings and does not require the use of high energy irradiation and carefully controlled conditions more suited to methods performed in factories.

The invention further provides a surface coated with a coating as hereinbefore described.

This description is accompanied by drawings of which

The invention is further illustrated by the following Examples of which Examples A and B are comparative. In the Examples, ambient temperature was about 18° C. and tough dry time and through dry time are measured using the following procedures.

Touch Dry Time Measurement

The time taken for a freshly applied coating to become dry to the touch is measured by a sand deposition procedure as follows:

A flat glass surface was degreased with acetone. The coating whose dry time is to be measured is applied by block spreader at 20° C. and 50% relative humidity to a thickness of 50 to 60 μm. This coating is allowed to dry at 20° C. and 50% relative humidity which were maintained throughout the measurement procedure.

A hopper having a small outlet in its base is filled with sand which then trickles out through the outlet. The drying coating is passed under the hopper outlet at a speed of 25.4 mm/hour while sand trickles onto it. Initially the sand sticks to the coating which is still wet but as time passes, the coating dries and autoxidises and there comes a point when the sand ceases to stick to it. The time taken to reach this point is regarded as the "touch dry time". The point is easily detected by blowing the loose sand from the fully dried coating so as to leave a trail of stuck sand of a length from which the touch dry time is obtained by dividing the length by the speed at which the coating passes under the outlet.

Through Dry Time Measurement: Beck Koller Method

The Beck Koller method measures the through dry time by measuring the time taken for a freshly applied coating to become resistant to penetration by a light weight needle. The method employs the Beck Koller apparatus shown diagrammatically in FIG. 3. The Beck Koller apparatus is available from the Mickle Laboratory Engineering Company of Gomsall in Surrey, England.

Figure 1:
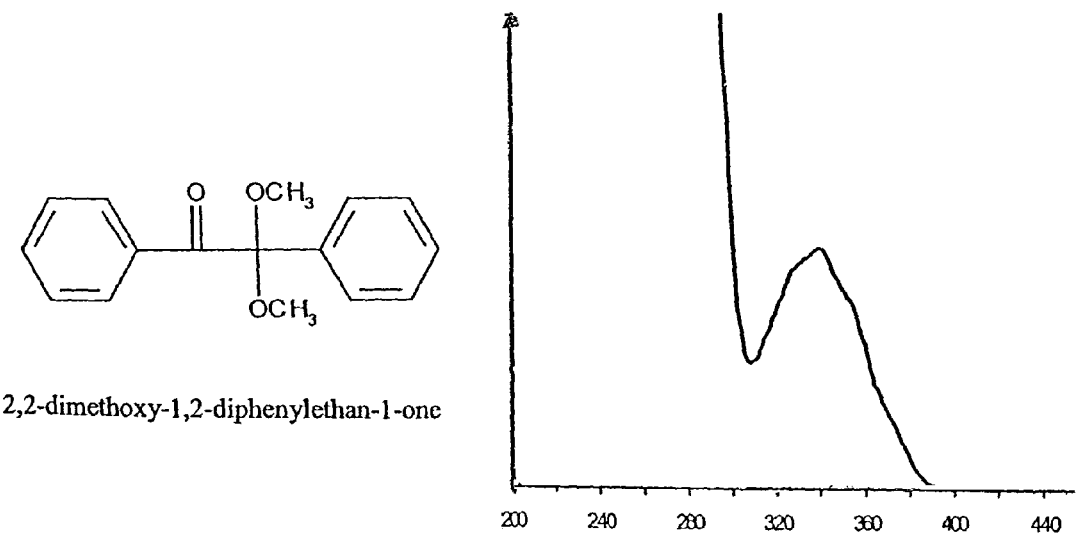
FIG. 1 shows graphic formulae of 2,2-dimethoxy-1,2-diphenylethan-1-one together with its absorption spectrum.
Figure 2:
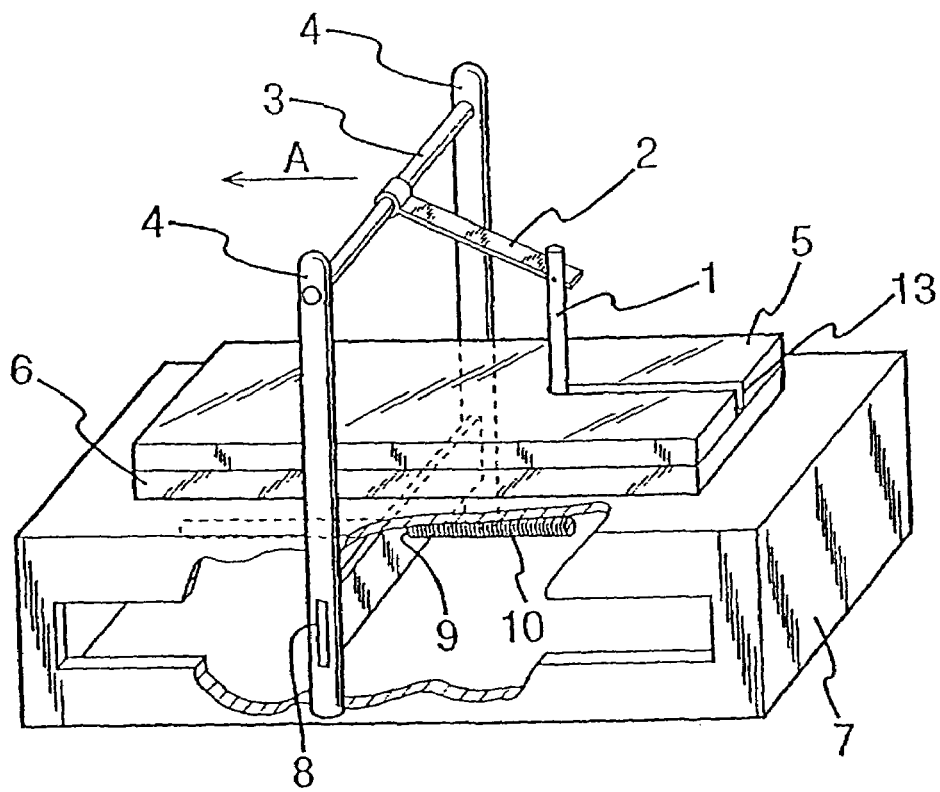
FIG. 2 shows a perspective diagrammatic representation on an exaggerated scale of apparatus used in the "Through Dry Time Measurement" procedure.
Figure 3:
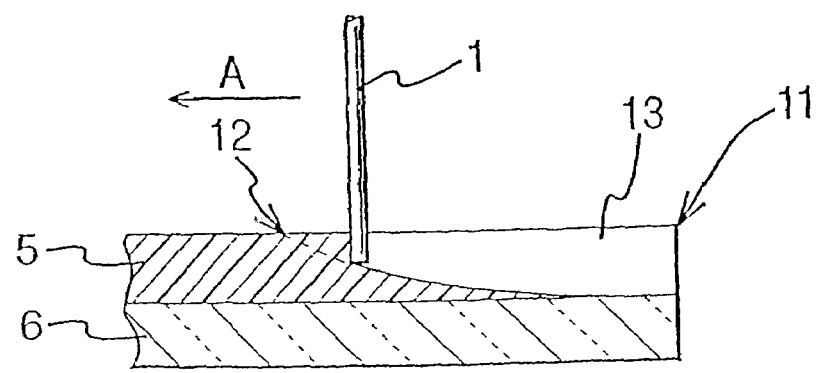
FIG. 3 shows in section on a larger scale a detail from FIG. 2.

FIG. 3 shows a needle 1 carried by an arm 2 attached to a horizontal rod 3 trunnion mounted between parallel vertical transporters 4. Needle 1 penetrates downwards into a coating 5 of coating composition which has been applied to a glass plate 6 which was then laid on metal box 7. Part of box 7 is shown broken away to reveal hole 9 and screw 10. The lower ends of transporters 4 are linked by bar 8 containing thredded hole 9 through which rotatable threaded driving screw 10 passes.

Rotation of screw 10 in an appropriate direction drives transporters 4 and needle 1 in the direction of arrow A. When coating 5 is freshly applied, it is still a viscous liquid and so when needle 1 is at point 11 (see FIG. 4), it can penetrate through coating 5 onto glass plate 6 and create a score 13. As needle 1 continues to move in direction A, drying and autoxidation of coating 5 proceed and its resistance to penetration by needle 1 increases and score 13 becomes less deep until at point 12, the resistance becomes total and no further penetration occurs. The distance from point 11 to point 12 is measured and is used, together with a knowledge of the speed of needle 1, to calculate the time taken to reach point 12. This time is deemed to be the "through dry time".

Coating 5 is applied to the surface of glass plate 6 as in the Touch Dry Time procedure except that a thickness of 100 μm was applied. Needle 1 is cylindrical having a diameter of 1 mm and a length of 40 mm and bears down on the coating with a force of 4 g weight. Needle 1 travels at a speed of 12.25 mm/hour. Again a temperature of 20° C. and a relative humidity of 50% was maintained throughout the procedure.

Base Paint

Preparation of a Base Paint, but omitting a Surface Promoter System: Firstly a bentonite preliminary composition and a rutile preliminary composition were made. The bentonite composition was made by stirring together 10 wt % of bentonite clay, 35 wt % of an autoxidisable long oil alkyd resin and 55 wt % of an aliphatic hydrocarbon solvent. The rutile preliminary composition was made by stirring together 68 wt % of pigment grade rutile particles, 21.5 wt % of an autoxidisable long alkyd resin and 10.5 wt % of an aliphatic hydrocarbon solvent.

The preliminary compositions together with the other components shown in Table 1 were added in turn to a 5 liter cylindrical mixing vessel provided with stirring paddles. Stirring was performed by rotating the paddles at a speed of 400 rpm during the addition of the components and continued at a speed of 400 rpm for a further 10 minutes. A homogenous test paint was produced to which various surface promoter systems could then be added.

EXAMPLES

Example 1 and Comparative Examples A and B

Three 100 g quantities of the Base paint were taken and into each was stirred one of the surface promoter systems as shown in Table 2. The amounts of each ingredient of the promoter systems used is also shown in Table 2 expressed as a weight percentage based on the total weight of autoxidisable alkyd binder polymer in the 300 g quantity. Each of the quantities of paint now containing surface promoter systems were subjected to surface dry time measurements performed either in light from conventional 60 watt domestic fluorescent tubes or in darkness and either at ambient temperatures or at 8° C. as indicated in Table 3 which also shows the surface drying times which were achieved. The results obtained are given in Table 3.

TABLE 1

FORMULATION OF TEST PAINT SUITABLE FOR SUBSEQUENT ADDITION OF A SURFACE PROMOTER

| Component | wt % Used |
|---|---|
| *Autoxidisable long oil alkyd resin (nv 75%) | 37.70 |
| Bentonite preliminary composition (resin nv content 35%) | 2.03 |
| Aliphatic hydrocarbon solvent | 5.39 |
| Rutile preliminary composition (resin nv 16.3%) | 44.92 |
| **Polyamide modified autoxidisable alkyd thixotrope (nv 51.5%) | 7.33 |
| Zirconium octoate through dry promoter (metal content 18%) | 0.55 |
| Calcium octoate through dry promoter (metal content 10%) | 1.60 |
| Dimethyl silicone oil: flow aid | 0.10 |

*A long oil alkyd from pentaerythritol, phthalic anhydride and tall oil fatty acid.
**A medium oil alkyd.

TABLE 2

SURFACE PROMOTERS USED

| Example | Metal promoter g | Metal ions wt % | "Irgacure" 819 wt % | "Irgacure" 651 wt % |
|---|---|---|---|---|
| 1 | 0.13 | 0.022 wt % *Mn | — | 1.02 |
| A | 0.13 | 0.022 wt % *Mn | 1.02 | — |
| B | 0.21 | 0.052 wt % #Co | — | — |

"Irgacure" 819 is dibenzoyl phenyl phosphine oxide and is supplied by CIBA Geigy of Basle, Switzerland.
"Irgacure" 651 is 2,2-dimethoxy-1,2-diphenylethan-1one and is also supplied by CIBA Geigy of Basle, Switzerland.
*From "Dapro" 5005 supplied by Elementis Plc of Staines, England.
From "Octa Soligen Cobalt 10" supplied by Borchers Also, coatings 100 μm thick of the paints were each applied to a glass panel as in the Touch Dry Time procedure and the coats were allowed to dry for 24 hours at 20° C. and a relative humidity of 50%. The specular gloss of each paint was determined using British Standard 3900: Part D5 of 1995 and an angle of 60°. The results are shown in Table 3.

Finally dried coats of the paints applied as for the gloss measurements described above were subjected to whiteness measurements after 1 hour and after 1 month from application of the coatings. The measurements were made by conventional spectrophotometric techniques and the results obtained are shown in Table 3.

Table 3 shows that the surface and through dry times of the promoter system containing manganese ions and 2,2-dimethoxy-1,2-diphenylethan-1-one is acceptable, whilst the whiteness is better than achieved using a photoinitiator free paint based on a cobalt surface drier, comparative example B; and better than comparative example A which uses Irgacure 819 as the photoinitiator. Example 1 is noticeably better for whiteness than comparative example A after 1 aging for a month. Of course better whiteness means less yellowing.

TABLE 3

TEST RESULTS

Surface Dry Time Hours*

| Example | At ambient temperature | | At 8° C. | | Gloss % | % Whiteness | |
| --- | --- | --- | --- | --- | --- | --- | --- |
| | In light | In dark | In light | In dark | | After 1 hour | After 1 month |
| 1 | 4.0 | NA | 6.5 | >12 | 80 | 80.6 | 67.5 |
| A | 4.0 | NA | 5.5 | >12 | 80 | 79.1 | 62.0 |
| B | 3.5 | NA | 6.0 | 6.5 | 81 | 79.4 | 74.8 |

*Through dry times were acceptable
NA means data not available

In a more general application of this invention, especially when discoloration is less significant as with paints of dark colour and/or high chroma, then the photoinitiator may be used with higher concentrations of manganese ions, for example up to 0.1 wt % based on the weight of autoxidisable binder polymer in the composition. This allows for good rates of autoxidation even in paints of strong light absorbing colours and again good gloss levels can achieved. Typically, paints of dark colour and/or high chroma have a lightness/darkness factor of over 60 and a chroma factor of over 70 according to the NCS or Swedish Standard Colour Atlas identified as Swedish Standard 01 91 02.

It is now very desirable that if cobalt ions are to be used as promoters then they are used in trace concentrations below 0.1 wt % based on the weight of autoxidisable binder polymer in the composition. This of course results in a major retardation of the promotion of the autoxidation, but the retardation can be at least partially offset by using the cobalts in combination with the photoinitiator, preferably the concentration of cobalt ions should be at least at least 0.001 wt %. Therefore in a modification of this invention, the surface promoter system comprise from 0.001 to 0.01 wt % cobalt ions and no other metal ions.

The invention claimed is:

1. An autoxidisable architectural coating composition suitable for application to surfaces at ambient temperatures and in natural daylight which composition contains an autoxidisable binder polymer and a promoter system for promoting autoxidation of the autoxidisable binder polymer wherein the system comprises
    a) less than 0.01 wt % of cobalt ions based on the weight of the autoxidisable binder polymer in the coating composition,
    b) from 0.001 to 0.06 wt % (based on the weight of autoxidisable binder polymer in the coating composition) of metal ions other than cobalt ions being metal ions which promote surface autoxidation,
    c) 2,2-dimethoxy-1,2-diphenylethan-1-one
and wherein the binder polymer is free of moieties derived from isocyanate functional ethylenically unsaturated compounds.

2. A coating composition according to claim 1 wherein the composition is free of cobalt ions.

3. A coating composition according to claim 1 wherein the composition contains a sufficient through promoter for the through promoter to provide to the coating composition from 0.5 to 2 wt % of metal ions based on the weight of the autoxidisable binder polymer in the composition.

4. A coating composition according to claim 1 wherein the composition comprises an additional photoinitiator in combination with 2,2-dimethoxy-1,2-diphenylethan-1-one.

5. A coating composition according to claim 4 wherein the additional photoinitiator is camphorquinone.

6. A coating composition according to claim 1 wherein the metal ions other than cobalt are manganese and/or vanadium.

7. A surface coated with a coating according to claim 1.

8. A method for applying a dried coat of an architectural coating composition to a surface in which a liquid coating of the composition is applied to the surface at ambient temperatures wherein the composition contains an autoxidisable binder polymer and a system for promoting surface autoxidation of the autoxidisable binder polymer and wherein the system as is described in any one of claims 1 and 2-6 and the coating composition is exposed to low energy irradiation by light of wavelength in the range 200 to 750 nm.

9. A method according to claim 8 wherein the light is natural daylight.

10. A method according to claim 8 wherein the light is from a 40 to 250 watt source.

11. A coating composition according to claim 3 wherein the composition is free of cobalt ions.

12. A coating composition according to claim 2 wherein the composition contains sufficient through promoter for the through promoter to provide to the coating composition from 0.5 to 2 wt % of metal ions based on the weight of the autoxidisable binder polymer in the composition.

13. A coating composition according to claim 12 wherein the composition comprises an additional photoinitiator in combination with 2,2-dimethoxy-1,2-diphenylethan-1-one.

14. A coating composition according to claim 13 wherein the additional photoinitiator is camphorquinone.

15. A coating composition according to claim 13 wherein the metal ions other than cobalt are manganese and/or vanadium.

16. A coating composition according to claim 12 wherein the surface promoting composition contains from 0.001 to 0.007 wt % of cobalt ions (based on the weight of autoxidisable binder polymer in the coating composition) as its only surface autoxidation promoting metal ions.

17. A coating composition according to claim 1 wherein the 2,2-dimethoxy-1,2-diphenylethan-1-one is present in an amount of from 0.3 to 2.0 wt % based on the weight of the autoxidisable binder polymer in the composition.

18. A coating composition according to claim 1 wherein the autoxidisable binder polymer consists of autoxidisable long oil alkyd present in an amount of 48.06% and polyamide modified autoxidisable alkyd thixotrope present in an amount of 7.33% based on the weight of the coating composition, wherein the 2,2-dimethoxy-1,2-diphenylethan-1-one is present in an amount of 1.02% based on the weight of the autoxidisable binder polymer, and wherein the coating composition further comprises, based on the weight of the autoxidisable binder polymer:

| | |
| --- | --- |
| bentonite clay | 0.20%; |
| rutile | 30.55%; |
| aliphatic hydrocarbon | 10.46%; |
| zirconium octoate through dry promoter | 0.55%; |
| calcium octoate through dry promoter | 1.60%; |
| dimethyl silicone | 0.10%; |
| dapro 5005 | 0.13%. |

19. A surface coated with a coating according to claim 18.

* * * * *